Patented May 17, 1949

2,470,084

UNITED STATES PATENT OFFICE 2,470,084

SUBSTITUTED ALPHA-HALOGEN ALKYL TETRAZOLES AND PROCESS FOR OBTAINING THE SAME

Edward K. Harvill, Orange, and Robert M. Herbst, Short Hills, N. J., assignors to E. Bilhuber, Inc., Orange, N. J., a corporation of New Jersey No Drawing. Application September 25, 1945, Serial No. 618,580

5 Claims. (Cl. 260—308)

This invention relates to new and valuable chemical compounds and to the preparation thereof, said compounds comprising substituted alpha-halogen alkyl tetrazoles of the general formula:

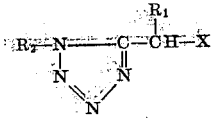

wherein $R_1$ is hydrogen, alkyl, aryl or aralkyl, X is chlorine or bromine and $R_2$ is an aryl, cycloalkyl, alkyl or heterocyclic group such as pyridyl, quinolyl, isoquinolyl, etc.

This application is a continuation-in-part of our copending application Serial No. 546,731, filed July 26, 1944.

These halogen tetrazoles are prepared in this invention from monosubstituted amides of alpha-halogen acids of the general formula

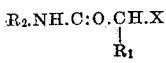

wherein $R_1$, $R_2$ and X are as above defined, by causing hydrazoic acid or sodium azide to react with the product formed by the interaction of halides of inorganic acids, such as phosphorus pentachloride, and the substituted amide. Previous syntheses of this type (v. Braun and Rudolph, Ber. 74, 264–272) have been limited to the use of amides in which the carboxyl group is attached to an aromatic nucleus. The action of phosphorus pentachloride on substituted amides containing a hydrogen atom on the alpha carbon atom leads to the formation of alpha-chloroimino chlorides which react further to eliminate hydrogen chloride and condense with themselves to form complex products (v. Braun, Josts, Heyman, Ber. 60, 92; N. V. Sidgwick, The Organic Chemistry of Nitrogen, p. 153, The Clarendon Press, Oxford, 1932).

Contrary to the results anticipated on the basis of experience reported in the literature and cited above, we have found that the halides of inorganic acids, such as phosphorus pentachloride, may be caused to react smoothly with mono N-substituted alpha-halogen acid amides with the formation of intermediates which react readily with hydrazoic acid or sodium azide to form the desired substituted alpha-halogen alkyl tetrazoles. Complex halogenated products are not formed as would be expected, in view of prior art.

These alpha-halogen alkyl tetrazoles of our invention are valuable as intermediates in the preparation of therapeutically active tetrazole compounds. The halogen atom in the compounds of our invention undergoes the reactions typical of an aliphatic halogen group and, for example, undergoes reaction with primary and secondary amines to form alkyl amino tetrazoles which are valuable therapeutic agents as described in a co-pending application.

Example 1

56 grams of chloroacetanilide and 500 cc. of anhydrous benzene were placed in a suitable reaction vessel, 72 grams of phosphorus pentachloride was added and the mixture was allowed to stand at room temperature, and usually below about 50° C., until a clear solution formed. After removing the benzene and phosphorus oxychloride, the residue was immediately treated with a benzene solution of 23 grams of hydrazoic acid. After the initial reaction had subsided, the solution was refluxed until the evolution of hydrogen chloride had ceased. The benzene was removed and the residue refluxed with water. From the cooled solution, 58 grams (90.5% of theory) of 1-phenyl-5-chloromethyl tetrazole was isolated as a colorless, crystalline material. The product was purified by recrystallization from carbon tetrachloride. M. P. 76–77° C.

Calculated: N=28.86%, Cl=18.22%. Found: N=29.07%, Cl=18.26%.

Example 2

131 grams of alpha-bromopropionanilide was dissolved in 500 cc. of dry benzene and treated with 118 grams of phosphorus pentachloride. When the reaction was completed, the benzene and phosphorus oxychloride were removed, a benzene solution of 33 grams of hydrazoic acid was added to the residue and the mixture refluxed until hydrogen chloride evolution had ceased. 127 grams of 1-phenyl-5-alpha-bromo-ethyl tetrazole was obtained from the reaction mixture in the manner described in Example 1. The tetrazole separated from aqueous methyl alcohol as a crystalline material. M. P. 98° C.

Example 3

From 165 grams of alpha-bromoisovaleranilide and 118 grams of phosphorus pentachloride, 156 grams of 1-phenyl-5-alpha-bromoisobutyl tetrazole was obtained by following the procedure described in Example 1. The pure compound crystallized from a mixture of ethyl ether-petroleum ether. M. P. 72.5–73.5° C.

Example 4

130 grams of alpha-chloroacetnaphthalide was added to 800 cc. of anhydrous benzene. Phosphorus pentachloride (124 grams) was added at room temperature after which the mixture was kept at this temperature until a clear solution formed. A benzene solution of 32 grams of hydrazoic acid was added and the solution was warmed at 50° C. until hydrogen chloride evolution had ceased. The solvent was removed and the residue was refluxed with water. From the mixture 85 grams of 1-alpha-naphthyl-5-chloromethyl tetrazole was obtained. The pure compound was isolated as a colorless crystalline material from aqueous methanol. M. P. 103–104° C.

Calculated: N=22.95%. Found: N=22.75%.

*Example 5*

72 grams of N-benzyl chloroacetamide in 500 cc. of anhydrous benzene was treated with 81 grams of phosphorus pentachloride at room temperature. When the reaction was completed, 18 grams of hydrazoic acid in benzene was added to the clear solution and the homogeneous mixture was warmed to 50° C. until hydrogen chloride evolution had ceased. The solvent was removed and the residue was recrystallized from 50% methanol. From the cooled solution 1-benzyl-5-chloromethyl tetrazole was obtained as a fine colorless crystalline material. M. P. 67–68° C. Yield 46 grams.

*Example 6*

From 49 grams of N-methyl chloroacetamide and 94.5 grams of phosphorus pentachloride, 21 grams of 1-methyl-5-chloromethyl tetrazole was obtained by following the procedure described in Example 4. The pure compound crystallized from ethyl ether. M. P. 65.0–66.5° C.

Calculated: N=42.26%. Found: N=42.08%.

*Example 7*

From 82 grams of N-cyclohexylchloroacetamide and 97 grams phosphorus pentachloride, 75 grams of 1-cyclohexyl-5-chloromethyl tetrazole was obtained by following the procedure described in Example 4. The pure compound crystallized from aqueous methanol. M. P. 108.5–109° C.

Calculated: N=28.00%. Found: N=27.93%.

By application of the above procedures to the appropriate substituted amides, the following halogen alkyl tetrazoles have been prepared and are cited by way of examples, but the scope of our invention is not limited thereto:

1-isoamyl-5-chloromethyl tetrazole. B. P. 163° C./4.5 mm.

1-cyclohexyl-5-alpha-bromoethyl tetrazole. M. P. 125.5–126.5° C.

1-m-nitrophenyl-5-chloromethyl tetrazole. M. P. 117.5–118° C.

1-p-methoxyphenyl-5-chloromethyl tetrazole, an oil, characterized as the 1-p-methoxyphenyl-5-dimethylamino methyl tetrazole hydrochloride. M. P. 176.5–177° C. dec.

1-p-nitrophenyl-5-chloromethyl tetrazole. M. P. 120–121° C.

1-methyl-5-chloromethyl tetrazole. B. P. 136° C./4 mm. M. P. 65.0–°66.5° C.

1-o-diphenyl-5-chloromethyl tetrazole. M. P. 99–100° C.

1-beta-naphthyl-5-chloromethyl tetrazole. M. P. 81.5–82.5° C.

1-benzyl-5-chloromethyl tetrazole. M. P. 67–68° C.

1-cyclohexyl-5-chloromethyl tetrazole. M. P. 108–109° C.

1-alpha-naphthyl-5-chloromethyl tetrazole. M. P. 103–104° C.

1-p-diphenyl-5-chloromethyl tetrazole. M. P. 150.5–151.5° C.

1-phenyl-5-alpha-bromoethyl tetrazole. M. P. 98° C.

1-phenyl-5-alpha-bromoisobutyl tetrazole. M. P. 72.5–73.5° C.

1-phenyl-5-chloromethyl tetrazole. M. P. 76–77° C.

We claim:

1. A process for the manufacture of substituted halogen alkyl tetrazoles of the general formula

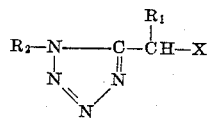

wherein $R_1$ is a member selected from the group consisting of hydrogen and alkyl, $R_2$ is a member selected from the group consisting of aryl, cycloalkyl, alkyl and aralkyl, and X is a member selected from the group consisting of chlorine and bromine which consists of causing a mono-N-substituted alpha-halogen acid amide of the general formula $R_2.NH.C:O.CH(R_1).X$ wherein $R_1$, $R_2$ and X are as above defined, to react with a phosphorous halide at a temperature sufficiently low to prevent alpha-halogenation, and treating the product so formed with a compound of the group consisting of hydrazoic acid and sodium azide.

2. The new and useful substituted halogen alkyl tetrazoles of the general formula wherein $R_1$ is a member selected from the group consisting of hydrogen and alkyl, $R_2$ is a member selected from the group consisting of aryl, cycloalkyl, alkyl and aralkyl, and X is a member selected from the group consisting of chlorine and bromine.

3. The compound 1 - phenyl - 5 - chloromethyl tetrazole.

4. The compound 1-phenyl - 5 - alpha-bromoethyl tetrazole.

5. The compound 1-α-naphthyl-5-chloromethyl tetrazole.

EDWARD K. HARVILL.
ROBERT M. HERBST.

REFERENCES CITED

The following references are of record in the file of this patent:

FOREIGN PATENTS

| Number | Country | Date |
| --- | --- | --- |
| 287,924 | Great Britain | July 16, 1929 |
| 576,327 | Germany | May 10, 1933 |

OTHER REFERENCES

Berichte, vol. 63, 1930, pp. 498–502. Copy in Scientific Library—Patent Office.)